(12) United States Patent
Abe

(10) Patent No.: US 6,917,528 B2
(45) Date of Patent: Jul. 12, 2005

(54) SWITCHING POWER TRANSMISSION DEVICE

(75) Inventor: Shigeo Abe, Tsurugashima (JP)

(73) Assignee: Toko Kabushiki Kaisha (JP)

( * ) Notice: Subject to any disclaimer, the term of this patent is extended or adjusted under 35 U.S.C. 154(b) by 74 days.

(21) Appl. No.: 10/697,469

(22) Filed: Oct. 30, 2003

(65) Prior Publication Data

US 2004/0130914 A1 Jul. 8, 2004

(30) Foreign Application Priority Data

Oct. 31, 2002 (JP) .................................. 2002-317461

(51) Int. Cl.[7] .......................................... H02M 3/335
(52) U.S. Cl. ........................ 363/22; 363/98; 363/132
(58) Field of Search ............................ 363/22, 23, 40, 363/56.02, 79, 98, 132

(56) References Cited

U.S. PATENT DOCUMENTS

| | | | | |
|---|---|---|---|---|
| 4,042,872 A | * | 8/1977 | McLeod | 363/23 |
| 4,061,957 A | * | 12/1977 | Jan Vader | 363/22 |
| 6,400,584 B1 | * | 6/2002 | Sabate et al. | 363/22 |

* cited by examiner

*Primary Examiner*—Jessica Han
(74) *Attorney, Agent, or Firm*—Renner, Kenner, Greive, Bobak, Taylor & Weber

(57) ABSTRACT

A switching power transmission device includes a transformer having primary and secondary windings, and two driving windings, the transformer being connected with an inductance and a capacitor. First and second switch circuits are connected to input power and the transformer so as to switch the current flow in the primary winding to produce a switched output on the secondary winding. A current, flowing through the first switching device, is detected by a current detecting device to control the current flow based on the detected value of the current.

4 Claims, 3 Drawing Sheets

SWITCHING POWER TRANSMISSION DEVICE

BACKGROUND OF THE INVENTION

1. Field of the Invention

This invention relates to a switching power device and an inverter device, which are used as a dc stabilizing power source and in power transmission at noncontact points, and more specifically relates to a switching power transmission device for supplying energy from the secondary side of a transformer to a load by turning switching elements ON and OFF by means of half-bridge self-excited oscillation.

2. Description of the Related Art

Japanese Patent Application Laid-open No. 1999-187664 (hereinafter "Patent Document No. 1") discloses a conventional half-bridge switching power device using self-excited oscillation; in this device, a first switch circuit and a second switch circuit are connected to the primary side of a transformer, and a switching control circuit switches the switching elements in the switch circuits alternately ON and OFF before and after each period when they are concurrently OFF.

FIG. 1 shows a circuit diagram of this switching power device.

As shown in FIG. 1, in the switching power device, a primary winding T1 of a transformer T, an inductor L, and a first switch circuit S1 are connected in series to an input power E; a series circuit comprises a capacitor C and a switch circuit S2, and is connected in parallel between the primary winding T1 and the inductor L. A first drive winding T3 generates a voltage, which is approximately proportionate to the voltage of the primary winding T1, and connects to a first controller 11; similarly, a second drive winding T4 generates a voltage, which is approximately proportionate to the voltage of the primary winding T1, and connects to a second controller 12. The first controller 11 connects to a control terminal of a first switching element Q1 of the first switch circuit S1, and the second controller 12 connects to a control terminal of a second switching element Q2 of the second switch circuit S2. The first switch circuit S1 is a parallel-connected circuit comprising the first switching element Q1, a first diode D1, and a first capacitor C1. The second switch circuit S1 is a parallel-connected circuit comprising the second switching element Q2, a second diode D2, and a second capacitor C2.

A rectifying diode Ds is connected in series to a secondary winding T2 of the transformer T. A capacitor Co connects to the output side of the rectifying diode Ds, forming a rectifying-smoothing circuit. A capacitive impedance Cs is connected in parallel to the rectifying diode Ds, and a detector 14 for detecting load voltage is connected between the load and the output of the rectifying-smoothing circuit. The output from the detector 14 is fed back to the first controller 11.

By way of another example, Japanese Patent Application Laid-open No. 2002-112544 (hereinafter "Patent Document No. 2") discloses a switching power device comprising a first controller 11, which controls the time taken from generating a voltage in the first drive winding T3 of the transformer T until a first switch circuit S1 turns ON and OFF, and a second controller 12, which controls the time taken from generating a voltage in the second drive winding T4 of the transformer T until a second switch circuit S2 turns ON and OFF, this switching power device operates self-excitedly by delaying the voltage from the drive windings by means of a delay circuit (using RC time constants), and controlling the ON/OFF times of the switching elements for a predetermined period of time.

However, the switching power devices described above have the following drawbacks.

The switching power device of Patent Document No. 1 is an ON/OFF device, which accumulates energy in the primary winding while the first switch circuit is ON, and discharges the accumulated energy from the secondary winding while the first switch circuit is OFF; however, as is clear from FIG. 1, since the sum of the input voltage Vin and the capacitor voltage Vc is applied to the switching elements Q1 and Q2, these elements must have high voltage resistance. Furthermore, since the input voltage Vin is applied directly to the primary winding T1 of the transformer T, the applied voltage is large, making it difficult to manufacture a smaller device.

The switching power device of Patent Document No. 1 comprises a first controller 11, which controls the times taken from generating a voltage in the first drive winding T3 of the transformer T until a first switch circuit S1 turns ON and OFF, and a second controller 12, which controls the times taken from generating a voltage in the second drive winding T4 of the transformer T until a second switch circuit S2 turns ON and OFF, this switching power device achieves self-excited operation by delaying the voltage from the drive windings by means of a delay circuit (using RC time constants), and controlling the ON/OFF times of the switching elements for a predetermined period of time. Therefore, self-excited operation can only be performed by using the voltages from the first and second drive windings T3 and T4, making it impossible to stabilize and control the operation with respect to variations among components and changes in temperature.

SUMMARY OF THE INVENTION

It is an object of the present invention to provide an inexpensive switching power transmission device which can deal with a wide range of fluctuation in the input voltage, while reducing switching loss and achieving high efficiency, and which allows the use of switching elements having low voltage resistance, reduces the number of components in the controller, and enables the transformer to be made smaller.

The switching power device of this invention comprises a first switch circuit and a second switch circuit, which are connected in series to input power; a series circuit comprising a primary winding of transformer having a leakage inductor and a capacitor, one end of the series circuit being connected to a contact point between the first switch circuit and the second switch circuit, and another end being connected to the input power; and a rectifying-smoothing circuit comprising a rectifying diode, connected to a secondary winding of the transformer. The first switch circuit is a parallel-connected circuit comprising a first switching element, a first diode, and a first capacitor; the second switch circuit is a parallel-connected circuit comprising a second switching element, a second diode, and a second capacitor. The switching power transmission device controls the output power by controlling the ON time of the first switching element so that, while the first switching element is ON, energy accumulates in the primary winding of the transformer and the capacitor, and, while the first switching element is OFF, output is obtained from the secondary winding. The transformer comprises a first drive winding, which generates a voltage substantially proportional to the primary winding voltage for turning the first switching element ON, and a second drive winding, which generates a voltage substantially proportional to the primary winding voltage for turning the second switching element ON; the first switch circuit comprises a current-detecting unit. A controller turns OFF the first switching element after monitoring the current flow thereto. The switching power transmission device self-excitedly oscillates using resonance between the capacitor, the leakage inductor, and the inductance of the primary winding of the transformer, via the first and second drive windings of the transformer, and alternately turning the first and second switching elements ON and OFF.

The current-detecting unit, which monitors the current flow to the first switching element, and the controller, which turns the first switching element OFF at a predetermined current value, directly observe the current flow to the primary winding of the transformer; therefore, even when an irregular current flows to the primary winding, since the switching element is turned OFF at a predetermined current value, the device can be kept stable with no danger of the switching element being destroyed.

For example, the ON resistance of a conventional MOSFET increases in proportion to approximately the square of the voltage resistance, but the conducting loss can be reduced by using switching elements having low voltage resistance. Switching elements with low voltage resistance are generally cheaper.

Further, the transformer comprises the controller for controlling the ON period of the first switching element, and first and second drive windings for controlling the ON/OFF of the first and second switching elements; partial current resonance between the primary winding of the transformer, the inductor, and the capacitor, makes it possible to reduce loss and noise.

In this way, by reducing the loss of the switching elements, the overall efficiency of the switching power device is increased, and it can be made small and inexpensive.

PREFERRED EMBODIMENTS OF THE INVENTION

Figure 2:
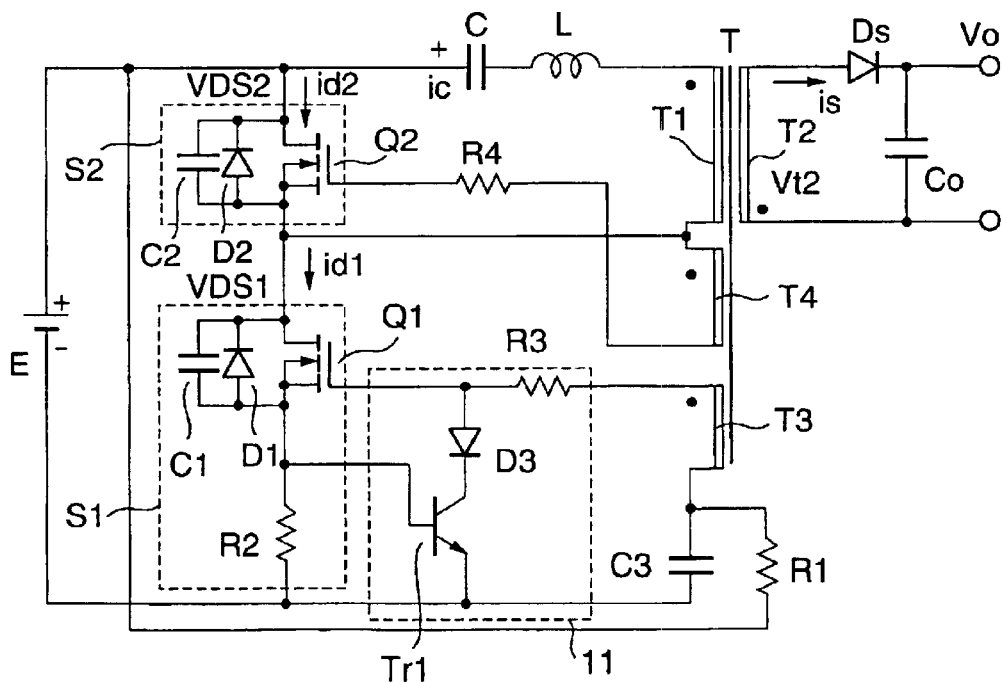
FIG. 2 is a circuit diagram of a switching power transmission device according to an embodiment of this invention.

FIG. 2 is a circuit diagram of a switching power transmission device according to an embodiment of this invention.

Figure 1:
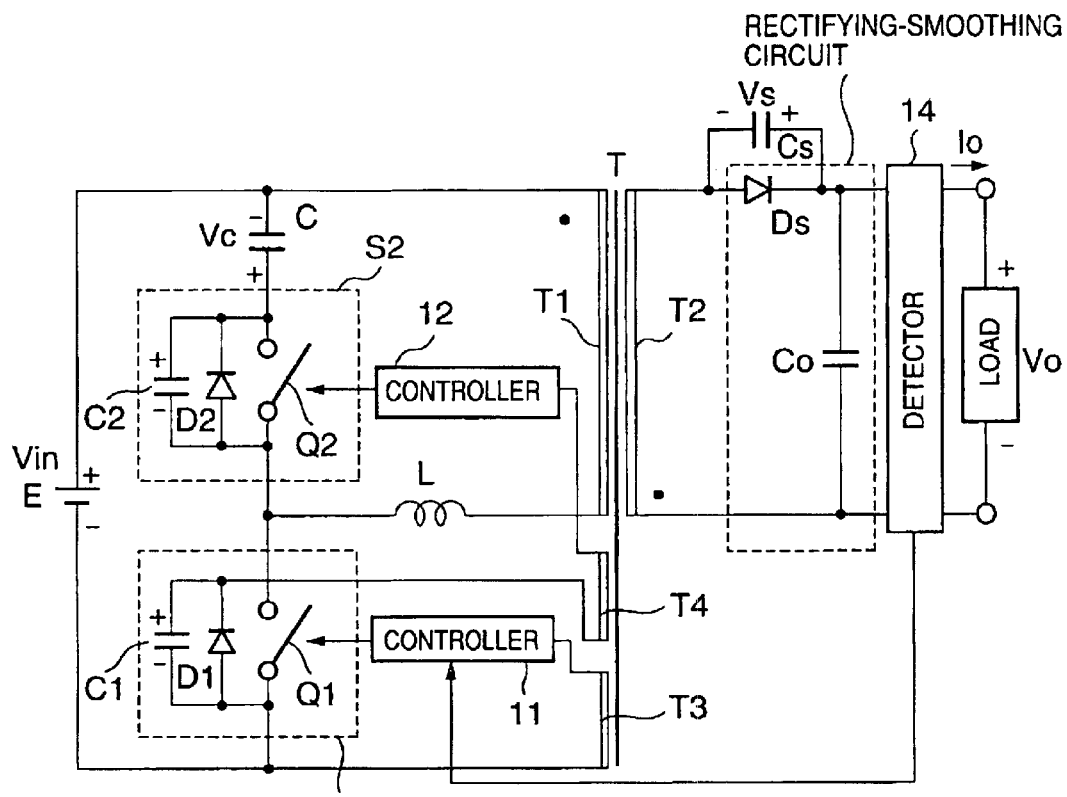
FIG. 1 is a diagram showing the schematic constitution of a conventional switching power device.

The basic point of constitutional difference between the switching power transmission device according to the embodiment of this invention and that of the conventional switching power device shown in FIG. 1 is the provision of a current-detecting unit (e.g. a resistor for detecting dc current, connected in series with the first switching element) in the first switch circuit; the current-detecting unit and the controller turn OFF the first switching element when a predetermined current has flowed to it. The specific circuit structure will be explained in detail below.

The first switch circuit S1 comprises a resistance for current-detection R2, which is connected in series with a parallel-connected circuit comprising a first switching element Q1, a first diode D1, and a first capacitor C1. A second switch circuit S2 is a parallel-connected circuit comprising a second switching element Q2, a second diode D2, and a second capacitor C2. The first and second switch circuits S1 and S2 are connected in series, and this series-circuit is connected in parallel to the input power E.

In the device of this embodiment, MOSFETs are used as the first switching element Q1 and the second switching element Q2.

An inductor L and a capacitor C are connected in series to the primary winding T1 of the transformer T, one end of this series-circuit being connected to the connection point between the first switch circuit S1 and the second switch circuit S2, and the other end being connected to one end (the +side) of the input power E.

The first drive winding T3 of the transformer T generates a voltage, which is substantially proportional to the voltage of the primary winding T1, and inputs it to the controller 11. The controller 11 has a resistance R3, connected between the first drive winding T3 and the control terminal (the MOSFET gate) of the first switching element Q1. A series-circuit comprising a diode D3 and a transistor Tr1 forms the controller 11 for turning the first switching element Q1 ON and OFF, and is connected to the control terminal (base) of the second switching element Q2. The source of the first switching element Q1 and the resistance R2 connect to one end (the−side) of the input power E, and connect from the connection point between the first switching element Q1 and the resistance R2 to the control terminal (base) of the transistor Tr1 of the controller 11.

The controller 11 turns the first switching element Q1 ON by using a voltage generated in the first drive winding T3; as the source current of the first switching element Q1 increases over time, so does the current flow to the resistance R2 comprising the current-detecting unit, and, when the current reaches a predetermined value, the transistor Tr1 turns ON. As a consequence, the first switching element Q1 is forcibly turned ON.

The current flowing to the primary winding T1 is directly observed by setting the current-detecting circuit to a predetermined current value in respect of the current flowing while the first switching element Q1 is ON, in the manner described above. Therefore, even when an irregular current flows to the primary winding, since the switching element is turned OFF at a predetermined current value, the device can be kept stable with no danger of the switching element being destroyed.

A resistance R1 is connected between the first drive winding T3 of the transformer T and the input power E (the+side). The resistance R1 applies an initiation voltage to the first switch circuit S1 when the power is turned on.

The transformer T comprises a second drive winding T4; a voltage generated in the second drive winding T4 is applied to the control terminal (gate) of the second switching element Q2 via a resistance R4, connected in series. The second switching element Q2 turns ON when the first switching element Q1 is turned OFF by the increased voltage, detected by the current-detecting circuit.

A rectifying diode Ds is connected in series with the secondary winding T2; a capacitor Co is connected to the output side of the rectifying diode Ds, and together they form a rectifying-smoothing circuit.

The operation of the switching power device described above will be explained.

Figure 3:
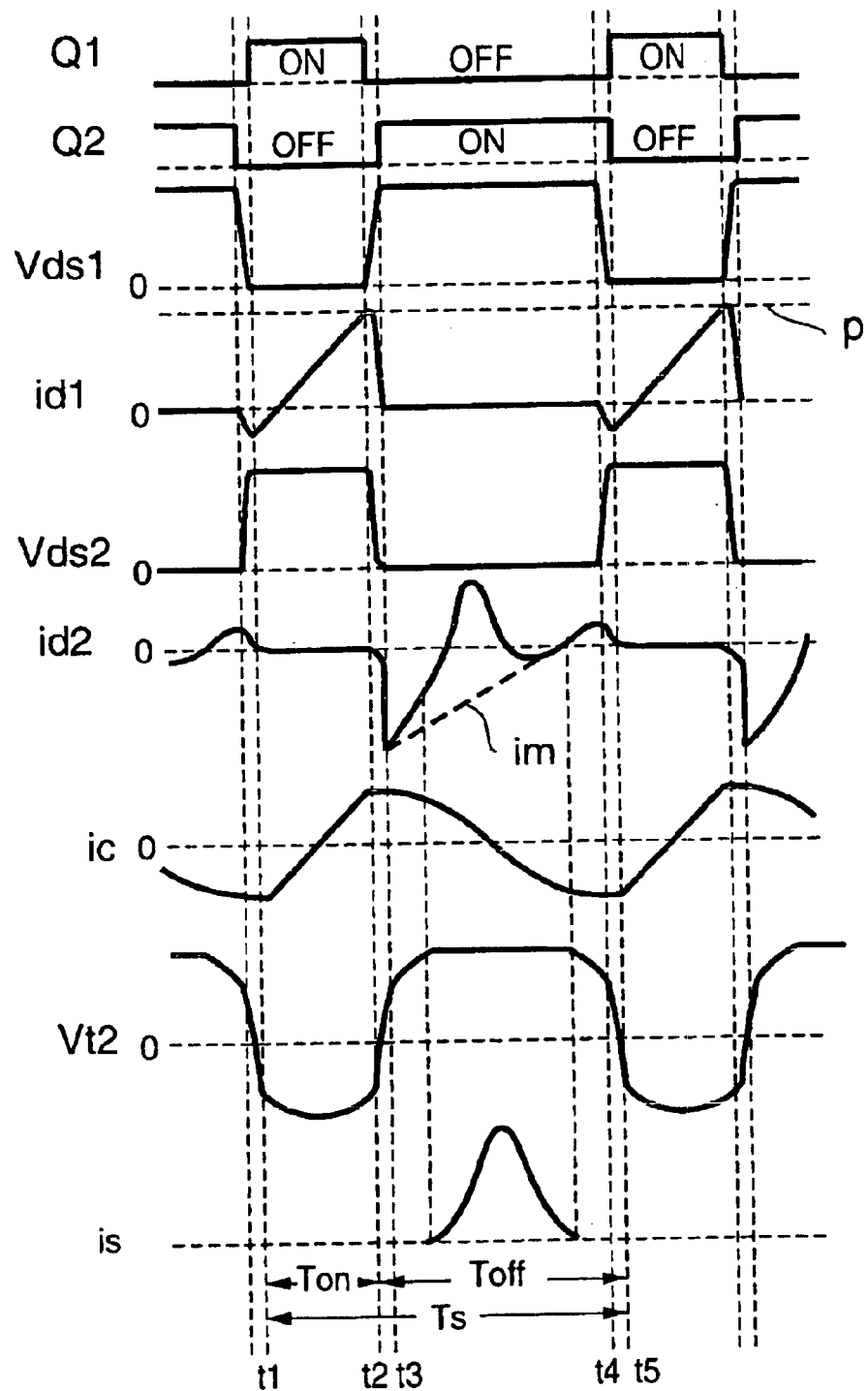
FIG. 3 is a waveform diagram of the same switching power transmission device.

FIG. 3 is a waveform diagram of the circuit shown in FIG. 2. The operation of this circuit will be explained with reference to FIGS. 2 and 3.

In FIG. 3, Q1 and Q2 are signals representing the ON/OFF switchings of the first and second switching elements Q1 and Q2; Vds1, Vds2, and Vt2 respectively represent double-ended voltage wave signals of the capacitors C1, C2, and the secondary winding T2 of the transformer T; and id1, id2, ic, and is respectively represent current wave signals of the switch circuits S1, S2, the capacitor C, and the rectifying diode Ds.

The switching operation after start-up the circuit can be divided into four operating states during times t1 to t5, in one switching cycle Ts.

The time of start-up will be explained first, followed by each of the operating states.

Start-up Time

When the input voltage Vin is applied, it passes via the resistance R1, through the first drive winding T3 of the transformer T, and the resistance R3, to the gate of the first switching element Q1.

When this voltage exceeds a threshold voltage of the first switching element Q1, the first switching element Q1 turns ON, applying the input voltage Vin to the capacitor C and the primary winding T1, whereby the voltage generated in the first drive winding T3 passes via the resistance R3 to the gate of the first switching element Q1. Consequently, the first switching element Q1 turns ON.

The four operating states during the times t1 to t5 in one switching cycle Ts under optimum conditions from the moment when the first switching element Q1 turns ON are described below.

State 1 (t1 to t2)

The first switching element Q1 is ON, a voltage obtained by subtracting the capacitor voltage Vc from the input voltage Vin is applied to the primary winding T1 of the transformer T, the primary winding current (i.e. the current id1 flowing to the first switch circuit S1) increases linearly, and exciting energy accumulates in the transformer T. Furthermore, this current charges the capacitor C, so that static energy accumulates in the capacitor C. When the current flow id1 to the first switch circuit S1 reaches the set current value p, the action of the controller 11 forcibly turns the first switching element Q1 OFF at time t2, shifting to state 2.

State 2 (t2 to t3)

When the first switching element Q1 turns OFF, the inductor L and the primary winding T1 of the transformer T resonate with the capacitors C1 and C2, charging the capacitor C1 and discharging the capacitor C2.

The section of the curve where Vds1 rises and Vds2 falls represents the sine wave caused by the resonance of the inductor L, the primary winding T1, and the capacitors C1 and C2.

When the double-ended voltage Vds2 of the capacitor C2 falls to zero, the diode D2 becomes conductive.

The voltage generated in the drive winding T4 passes through the resistance R4, and is supplied to the gate terminal of the second switching element Q2, turning the second switching element Q2 ON. Consequently, a zero voltage switching operation is performed, shifting to state 3.

On the secondary side at this time, the rectifying diode Ds is not conducting, and the current is is zero.

State 3 (t3 to t4)

In state 3, on the primary side, the diode D2 and the second switching element Q2 are conducting, and the inductor L and the capacitor C start to resonate. During this period, the charge of the capacitor C is discharged.

At this time, on the secondary side, the rectifying diode Ds is conducting, so that the exciting energy, accumulated in the transformer T, and the static energy, accumulated in the capacitor C, are released from the secondary winding T2, and output via the rectifying-smoothing circuit. Moreover, the current is flow to the rectifying diode Ds has a waveform switch to that is configured by values, obtained by subtracting the linearly decreasing exciting current im from the resonance current id2 of the primary side inductor L and the capacitor C. For this reason, it rise comparatively sharply from zero, and, after reaching its peak where the current change rate is zero, decreases toward zero current.

When the exciting current im of the transformer T becomes zero, the rectifying diode Ds turns OFF the zero current, so that the secondary side current becomes zero.

On the primary side of the transformer T, the charging of the capacitor C reverses the direction of the exciting current im, which flows in the opposite direction to that in State 1, exciting the transformer T.

The voltage generated in the second drive winding T4 passes through the resistance R4, and turns the second switching element Q2 OFF near zero current, so that the zero current turns OFF.

When the second switching element Q2 turns OFF, a reverse voltage is applied to the secondary side rectifying diode, whereby the winding voltage of the transformer starts to reverse.

During the time t4 where the second switching element Q2 and the rectifying diode Ds are both OFF, a reverse voltage is applied to the rectifying diode Ds, shifting to State 4.

State 4 (t4 to t5)

In State 4, the inductor L and the primary winding T1 of primary side transformer T resonate with the capacitors C1 and C2, discharging the capacitor C1 and charging the capacitor C2.

The diode D1 becomes conductive when the double-sided voltage Vds1 of the capacitor C1 falls to zero.

At this time, the voltage generated in the first drive winding T3 passes through the resistance R3 to the gate of the first switching element Q1, turning the first switching element Q1 ON at time t5, and the zero-voltage switching operation ends State 4.

The above operation is carried out in one switching cycle Ts, and is repeated in each subsequent cycle.

According to the operation described above, exciting energy accumulates in the primary winding T1 of the transformer T, and static energy accumulates in the capacitor C, during the period when the first switching element Q1 is ON; when the first switching element Q1 turns OFF, the exciting energy and static energy are discharged, so that the current peak value is lower than in the conventional switching power device of FIG. 1 (i.e. a device where only exciting energy is accumulated while the first switching element Q1 is ON, and this exciting energy is discharged when the first switching element Q1 is OFF), and conducting loss can be reduced.

In the switching power transmission device according to the embodiment shown in FIG. 2, since the first and second switching elements Q1 and Q2 turn ON at zero voltage, and the second switching element Q2 turns OFF near zero voltage, as in the conventional switching power device, the switching loss and switching surge can be greatly reduced.

Furthermore, the secondary side rectifying diode Ds turns ON at zero current, and its current wave rises comparatively sharply from zero current; after peaking when the current change rate is zero, it turns off when the current returns to zero, reducing switching noise.

Since leaked inductance from the transformer is incorporated into the circuit operation, there is no switching surge; furthermore, since the voltage is clamped, it is possible to use semiconductor elements having low voltage resistance.

Since sharp changes in the current flowing to the switching elements and the voltage wave are alleviated, switching noise can be reduced.

The voltage applied to the primary winding is approximately half that of the RCC (ringing-choke converter) type shown in FIG. 1. For this reason, the number of primary windings can be reduced, facilitating the voltage-resistance setting of the transformer and enabling the transformer to be made smaller.

Figure 4:
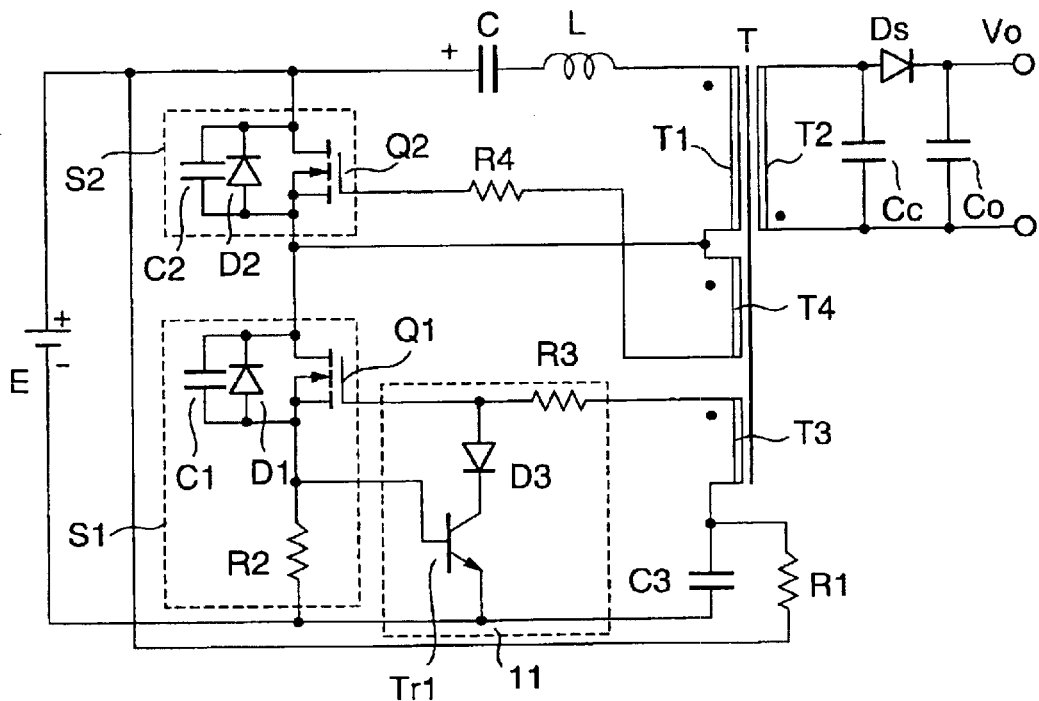
FIG. 4 is a circuit diagram of a switching power transmission device according to another embodiment of this invention.

FIG. 4 is an example of a circuit aimed at transmitting power to the switching power device shown in FIG. 2.

As shown in FIG. 4, the circuit is characterized in that a capacitor Cc is connected in parallel with the secondary winding T2 of the transformer T. A rectifying diode Ds is connected in series with the secondary winding T2, and forms a rectifying-smoothing circuit with a capacitor Co, connected to the output side of the rectifying diode Ds. The primary side circuit is the same as that in FIG. 2.

When transmitting power at a noncontact point and the like, in power transmission using a transformer having a large amount of leakage flux, or using electromagnetic induction between separated primary and secondary transformers, the capacitor resonates with the secondary side winding of the transformer, enabling more power to be transmitted.

Figure 5:
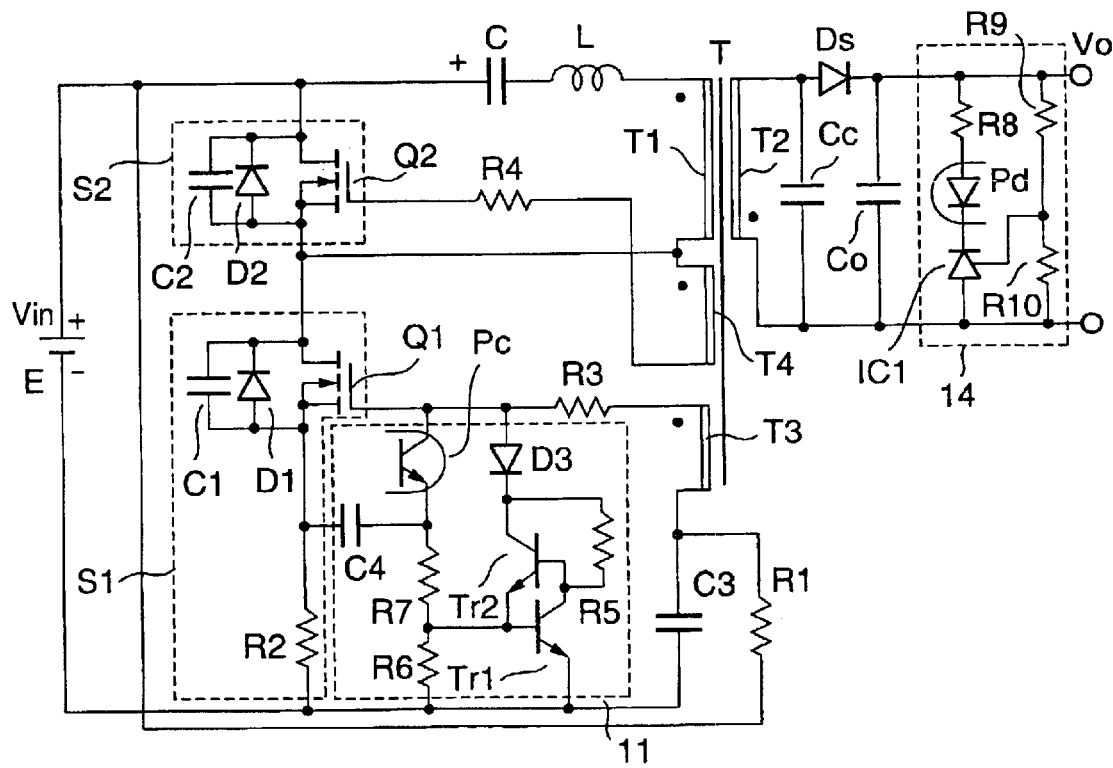
FIG. 5 is a circuit diagram of a switching power transmission device according to another embodiment of this invention.

FIG. 5 is an example of a circuit aimed at stabilizing the output voltage of the switching power transmission device shown in FIG. 3.

As shown in FIG. 5, the contact points of split resistances R9 and R10 in a detector 14 are connected to the input terminals of a shunt regulator IC1. The shunt regulator IC1 connects to a photodiode Pd.

The shunt regulator IC1 controls the current between the cathode and anode, so that the voltage of the input terminals matches a reference voltage. Change in the current is converted by the strength or weakness of the light from the photodiode Pd, and is input to a phototransistor Pc, connected to the first drive winding T3 of the transformer T.

This circuit controls the set current of the controller via the phototransistor Pc using the strength and weakness of the current flow in the photodiode Pd, and, as a result, controls the current value of the first switching element Q1.

That is, when the output voltage increases and the current of the photodiode Pd is about to increase, the current value of the first switching element Q1 decreases, reducing the output voltage; conversely, when the output voltage decreases and the current of the photodiode Pd is about decrease, the current value of the first switching element Q1 increases, boosting the output voltage.

This operation stabilizes the output voltage.

The present invention is not limited to the embodiments of the switching power transmission device described above. For example, the current-detecting unit may comprise a current transformer instead of the resistance R2. Furthermore, the secondary side may be synchronously rectified. The controller 11 may comprise an IC. Moreover, the first switching element Q1 and the second switching element Q2 are not limited to MOSFETs, and may instead comprise other semiconductor elements such as transistors.

The switching power transmission device of this invention obtains the following advantages.

By providing drive windings for driving the first and second switching elements, a current-detecting unit in the first switch circuit, adding the detected current to a control circuit, and providing a self-exciting resonant circuit which turns OFF the first switching element in accordance with a preset current value, and turns both switching elements alternately ON and OFF, the number of components can be reduced, and the device can be made smaller. Moreover, resonating the secondary side reduces noise, and greatly reduces switching loss. Since the voltage applied to the first and second switching elements becomes the input voltage Vin, semiconductor elements having low voltage resistance can be used, increasing the efficiency of the switching power transmission device and enabling it to be made smaller.

What is claimed is:

1. A switching power transmission device comprising:
a first switch circuit and a second switch circuit, which are connected in series to input power; a series circuit comprising a primary winding of transformer having a leakage inductor and a capacitor, one end of the series circuit being connected to a contact point between the first switch circuit and the second switch circuit, and another end being connected to the input power; and a rectifying-smoothing circuit comprising a rectifying diode, connected to a secondary winding of the transformer;

the first switch circuit being a parallel-connected circuit comprising a first switching element, a first diode, and a first capacitor;

the second switch circuit being a parallel-connected circuit comprising a second switching element, a second diode, and a second capacitor;

the switching power transmission device controlling the output power by controlling the ON time of the first switching element so that, while the first switching element is ON, energy accumulates in the primary winding of the transformer and the capacitor, and, while the first switching element is OFF, output is obtained from the secondary winding;

the transformer comprising a first drive winding, which generates a voltage substantially proportional to the primary winding voltage for turning the first switching element ON, and a second drive winding, which generates a voltage substantially proportional to the primary winding voltage for turning the second switching element ON; the first switch circuit comprising a current-detecting unit;

the switching power transmission device also comprising a controller which turns OFF the first switching element after monitoring the current flow thereto; and self-excitedly oscillating using resonance between the capacitor, the leakage inductor, and the inductance of the primary winding of the transformer, via the first and second drive windings of the transformer, and alternately turning the first and second switching elements ON and OFF.

2. The switching power transmission device as described in claim 1, the controller changing the relative value of the current by using an outside signal.

3. A switching power transmission device comprising:

a first switch circuit and a second switch circuit, which are connected in series to input power; a series circuit comprising a first primary winding of transformer having a leakage inductor and a capacitor, one end of the series circuit being connected to a contact point between the first switch circuit and the second switch circuit, and another end being connected to the input power; and a rectifying-smoothing circuit comprising a rectifying diode, connected to a secondary winding of the transformer;

the first switch circuit being a parallel-connected circuit comprising a first switching element, a first diode, and a first capacitor;

the second switch circuit being a parallel-connected circuit comprising a second switching element, a second diode, and a second capacitor;

the switching power transmission device controlling the output power by controlling the ON time of the first switching element so that, while the first switching element is ON, energy accumulates in the primary winding of the transformer and the capacitor, and, while the first switching element is OFF, output is obtained from the secondary winding;

the transformer comprising a first drive winding, which generates a voltage substantially proportional to the primary winding voltage for turning the first switching element ON, and a second drive winding, which generates a voltage substantially proportional to the primary winding voltage for turning the second switching element ON; a capacitor being provided in parallel with the secondary winding of the transformer, and resonance being generated therein; the first switch circuit comprising a current-detecting unit;

the switching power transmission device also comprising a controller which turns OFF the first switching element after monitoring the current flow thereto; and self-excitedly oscillating by using resonance between the capacitor, the leakage inductor, and the inductance of the primary winding of the transformer, via the first and second drive windings of the transformer, and alternately turning the first and second switching elements ON and OFF.

4. The switching power transmission device as described in claim 3, the controller changing the relative value of the current by using an outside signal.

* * * * *